United States Patent
Takano

(10) Patent No.: US 11,211,995 B2
(45) Date of Patent: *Dec. 28, 2021

(54) ALLOCATING TIME-FREQUENCY BLOCKS FOR A RELAY LINK AND AN ACCESS LINK

(71) Applicant: Sony Corporation, Tokyo (JP)

(72) Inventor: Hiroaki Takano, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/695,241

(22) Filed: Nov. 26, 2019

(65) Prior Publication Data

US 2020/0099440 A1   Mar. 26, 2020

Related U.S. Application Data

(60) Division of application No. 14/635,715, filed on Mar. 2, 2015, now Pat. No. 10,530,460, which is a
(Continued)

(30) Foreign Application Priority Data

Jul. 27, 2009   (JP) ................................. 2009-174589

(51) Int. Cl.
*H04B 7/15* (2006.01)
*H04B 7/155* (2006.01)
(Continued)

(52) U.S. Cl.
CPC .............. *H04B 7/15* (2013.01); *H04B 7/155* (2013.01); *H04W 16/26* (2013.01); *H04W 72/1268* (2013.01); *H04B 7/2606* (2013.01); *H04W 72/1257* (2013.01); *H04W 72/1273* (2013.01); *H04W 84/047* (2013.01)

(58) Field of Classification Search
None
See application file for complete search history.

(56) References Cited

U.S. PATENT DOCUMENTS

| 5,432,455 A | 7/1995 | Blades |
| 5,434,509 A | 7/1995 | Blades |

(Continued)

FOREIGN PATENT DOCUMENTS

| CN | 101416465 A | 4/2009 |
| EP | 1 324 509 A2 | 7/2003 |

(Continued)

OTHER PUBLICATIONS

Extended European Search Report dated Apr. 5, 2016 in European Patent Application No. 17204176.6, 7 pages.
(Continued)

*Primary Examiner* — Hong Shao
(74) *Attorney, Agent, or Firm* — Xsensus LLP

(57) ABSTRACT

A base station is provided with a communication unit for communicating with a mobile terminal via a relay link between the base station and a relay device and an access link between the relay device and the mobile terminal, and a selection unit for selecting an allocation pattern of an uplink of the relay link, a downlink of the relay link, an uplink of the access link, and a downlink of the access link to frequency-time blocks from a plurality of allocation patterns that are different in delay occurring between the base station and the mobile terminal.

13 Claims, 12 Drawing Sheets

Related U.S. Application Data continuation of application No. 13/383,590, filed as application No. PCT/JP2010/059853 on Jun. 10, 2010, now Pat. No. 8,989,077.

(51) Int. Cl.
*H04W 16/26* (2009.01)
*H04W 72/12* (2009.01)
*H04B 7/26* (2006.01)
*H04W 84/04* (2009.01)

(56) References Cited

U.S. PATENT DOCUMENTS

| | | | |
|---|---|---|---|
| 5,619,503 A | 4/1997 | Dent | |
| 6,016,311 A | 1/2000 | Gilbert et al. | |
| 6,301,482 B1 | 10/2001 | Shohara | |
| 6,415,131 B1 | 7/2002 | Shohara | |
| 6,785,510 B2 | 8/2004 | Larsen | |
| 6,807,165 B2 | 10/2004 | Belcea | |
| 6,925,068 B1 | 8/2005 | Stanwood et al. | |
| 7,130,807 B1 | 10/2006 | Mikurak | |
| 7,376,425 B2 | 5/2008 | Larola et al. | |
| 7,433,386 B2 | 10/2008 | Lucidarme et al. | |
| 7,486,639 B2 | 2/2009 | Stanwood et al. | |
| 7,620,370 B2 | 11/2009 | Barak et al. | |
| 7,720,572 B2 | 5/2010 | Ziegler et al. | |
| 7,904,093 B2 | 3/2011 | Nystrom et al. | |
| 7,957,837 B2 | 6/2011 | Ziegler et al. | |
| 8,014,338 B2 | 9/2011 | Lee et al. | |
| 8,032,409 B1 | 10/2011 | Mikurak | |
| 8,069,256 B2 | 11/2011 | Rasti | |
| 8,081,721 B2 | 12/2011 | Osseiran et al. | |
| 8,125,972 B2 | 2/2012 | Agarwal et al. | |
| 8,295,395 B2 | 10/2012 | Mueck et al. | |
| 8,305,972 B2 | 11/2012 | Baker et al. | |
| 8,315,570 B2 | 11/2012 | Arbel | |
| 8,320,284 B2 | 11/2012 | Doppler et al. | |
| 8,401,020 B2 | 3/2013 | Capone et al. | |
| 8,441,977 B2 | 5/2013 | Min | H04B 7/155 370/315 |
| 8,478,283 B2 | 7/2013 | Periyalwar et al. | |
| 8,498,227 B2 | 7/2013 | Nentwig et al. | |
| 8,761,115 B2 | 6/2014 | Vrzic et al. | |
| 8,780,813 B2 | 7/2014 | Beems Hart et al. | |
| 8,982,864 B2 | 3/2015 | Takano | |
| 9,148,217 B2 | 9/2015 | Kim | H04B 7/2606 |
| 2001/0038810 A1 | 11/2001 | Larsen | |
| 2003/0125057 A1 | 7/2003 | Takeda et al. | |
| 2003/0125067 A1 | 7/2003 | Takeda | H04W 52/247 455/522 |
| 2005/0243745 A1 | 11/2005 | Stanwood et al. | |
| 2007/0070929 A1 | 3/2007 | Kang et al. | |
| 2007/0005368 A1 | 4/2007 | Lee et al. | |
| 2007/0081502 A1 | 4/2007 | Lee | H04L 5/0007 370/337 |
| 2007/0086368 A1 | 4/2007 | Lee | H04B 7/155 370/313 |
| 2007/0087691 A1 | 4/2007 | Lee | H04B 7/155 455/13.2 |
| 2007/0104174 A1 | 5/2007 | Nystrom et al. | |
| 2007/0124144 A1 | 5/2007 | Johnson | |
| 2007/0128899 A1 | 5/2007 | Mayer | |
| 2007/0192910 A1 | 8/2007 | Vu et al. | |
| 2007/0198128 A1 | 8/2007 | Ziegler et al. | |
| 2007/0199108 A1 | 8/2007 | Angle et al. | |
| 2007/0230605 A1 | 10/2007 | Osseiran et al. | |
| 2007/0281613 A1 | 12/2007 | Lee et al. | |
| 2008/0056173 A1 | 3/2008 | Watanabe | H04L 1/1628 370/315 |
| 2008/0090575 A1 | 4/2008 | Barak et al. | |
| 2008/0107073 A1 | 5/2008 | Hart | H04L 5/14 370/330 |
| 2008/0120129 A1 | 5/2008 | Seubert et al. | |
| 2008/0177994 A1 | 7/2008 | Mayer | |
| 2008/0219229 A1 | 9/2008 | Zheng | H04B 7/15557 370/338 |
| 2008/0247340 A1 | 10/2008 | Choi | H04W 72/048 370/281 |
| 2008/0316955 A1 | 12/2008 | Yu | |
| 2009/0047971 A1 | 2/2009 | Fu | |
| 2009/0074006 A1 | 3/2009 | Qi et al. | |
| 2009/0077444 A1 | 3/2009 | Qi et al. | |
| 2009/0092090 A1 | 4/2009 | Beems Hart et al. | |
| 2009/0141676 A1 | 6/2009 | Maheshwari et al. | |
| 2009/0175214 A1 | 7/2009 | Sfar | H04B 7/15592 370/315 |
| 2009/0177323 A1 | 7/2009 | Ziegler et al. | |
| 2009/0268658 A1 | 10/2009 | Chang | H04B 7/155 370/315 |
| 2009/0296668 A1 | 12/2009 | Capone et al. | |
| 2010/0002621 A1 | 1/2010 | Huo | H04B 7/15542 370/315 |
| 2010/0008283 A1 | 1/2010 | Chitrapu | H04B 7/026 370/312 |
| 2010/0029295 A1 | 2/2010 | Toubboul et al. | |
| 2010/0035620 A1 | 2/2010 | Naden | H04B 7/15542 455/450 |
| 2010/0039966 A1 | 2/2010 | Agarwal et al. | |
| 2010/0054170 A1 | 3/2010 | Zhu | H04W 72/04 370/315 |
| 2010/0103869 A1 | 4/2010 | Naden | H04W 92/20 370/328 |
| 2010/0110953 A1 | 5/2010 | Kim et al. | |
| 2010/0124185 A1 | 5/2010 | Wu et al. | |
| 2010/0189081 A1 | 7/2010 | Zhang | H04B 7/2606 370/336 |
| 2010/0260093 A1 | 10/2010 | Liu | H04B 7/2606 370/315 |
| 2010/0278221 A1 | 11/2010 | Qi et al. | |
| 2010/0285808 A1 | 11/2010 | Horiuchi | H04B 7/15542 455/450 |
| 2011/0053495 A1 | 3/2011 | Hara et al. | |
| 2011/0096715 A1 | 4/2011 | Park | H04W 72/1215 370/315 |
| 2011/0116432 A1 | 5/2011 | Doppler et al. | |
| 2011/0170475 A1 | 7/2011 | Raaf | H04B 7/15542 370/315 |
| 2011/0261781 A1 | 10/2011 | Vrzic et al. | |
| 2012/0250563 A1 | 10/2012 | Liu et al. | |

FOREIGN PATENT DOCUMENTS

| | | | |
|---|---|---|---|
| EP | 1 777 877 A2 | 4/2007 | |
| EP | 2 077 630 A1 | 7/2009 | |
| JP | 2002 252587 | 9/2002 | |
| JP | 2008 177969 | 7/2008 | |
| WO | 2006/052502 A2 | 5/2006 | |
| WO | WO 2008/135842 A2 | 11/2008 | |
| WO | WO-2008135842 A2 | 11/2008 | H04B 7/155 |
| WO | WO 2008146469 A1 | 12/2008 | H04B 7/15542 |
| WO | WO 2009 072191 | 6/2009 | |

OTHER PUBLICATIONS

Combined Chinese Office Action and Search Report dated Aug. 14, 2017 in Patent Application No. 201410758810.3 (with English language translation).

Extended European Search Report dated Aug. 12, 2015 in Patent Application No. 10804195.5.

3GPP TSG RAN WG1 Meeting #55, "Discussion on the TD relay for FDD system," Panasonic, R1-084232, pp. 1-6, (Nov. 10-14, 2008).

International Search Report dated Sep. 7, 2010 in PCT/JP10/59853 Filed Jun. 10, 2010.

Office Acton dated Feb. 8, 2014, in Chinese Patent Application No. 201080032841.0 (with English-language Translation).

ALLOCATING TIME-FREQUENCY BLOCKS FOR A RELAY LINK AND AN ACCESS LINK

CROSS-REFERENCE TO RELATED APPLICATIONS

The present application is a divisional of U.S. application Ser. No. 14/635,715, filed Mar. 2, 2015, which is a continuation of U.S. application Ser. No. 13/383,590, filed Jan. 12, 2012 (now U.S. Pat. No. 8,989,077), which is the National Stage of PCT/JP2010/059853, filed Jun. 10, 2010, which claims priority to Japanese Patent Application No. 2009-174589, filed Jul. 27, 2009, the entire contents of each are incorporated herein by reference.

TECHNICAL FIELD

The present invention relates to a base station, a communication system, a mobile terminal, and a relay device.

BACKGROUND ART

In 3GPP (Third Generation Partnership Project), a technology that uses a relay device (relay station) to realize an increase in the throughput at the cell edge is being actively considered.

This relay device receives, in a downlink, a signal transmitted from a base station, amplifies the same, and then transmits the amplified signal to a mobile terminal. By performing such relaying, the relay device can increase the signal-to-noise ratio than when directly transmitting a signal from the base station to the mobile terminal. Similarly, in an uplink, the relay device can maintain high signal-to-noise ratio by relaying a signal transmitted from the mobile terminal to the base station. Additionally, such relaying by the relay device is described in Non-Patent Literature 1, for example.

Furthermore, as a relay scheme of the relay device, an Amp-Forward type, a Decode-Forward type, and the like can be cited. The Amp-Forward type is a scheme of amplifying and transmitting a received signal while keeping it as an analogue signal. According to this Amp-Forward type, although the signal-to-noise ratio is not improved, there is an advantage that the communication protocol does not have to be refined. Additionally, the relay device has a feedback path between a transmission antenna and a reception antenna, and is designed such that the feedback path does not oscillate.

The Decode-Forward type is a scheme of converting a received signal to a digital signal by AD conversion, performing decoding such as error correction on the digital signal, encoding again the decoded digital signal, converting the digital signal to an analogue signal by DA conversion, amplifying the analogue signal, and transmitting the same. According to the Decode-Forward type, the signal-to-noise ratio can be improved by a coding gain. Also, by storing a digital signal obtained by reception in a memory and transmitting the digital signal in the next time slot, the relay device can avoid oscillation of a feedback circuit between a transmission antenna and a reception antenna. Additionally, the relay device is also capable of avoiding the oscillation by changing the frequency instead of the time slot.

CITATION LIST

Non-Patent Literature

Non-Patent Literature 1: Panasonic, "Discussion on the TD relay and FD relay for FDD system", Nov. 10-14, 2008

SUMMARY OF INVENTION

Technical Problem

On the other hand, in LTE (Long Term Evolution) and LTE-Advanced, reduction in the communication delay between users (for example, 50 ms or less) is desired. However, if a relay device is provided between a base station and a mobile terminal, delay is caused at the relay device, and the issue related to delay becomes more significant.

Accordingly, the present invention is made in view of the above problem, and the object of the present invention is to provide a base station, a communication system, a mobile terminal, and a relay device which are novel and improved, and which are capable of allocating each link to a frequency-time block according to any of a plurality of link allocation patterns with different delay characteristics.

Solution to Problem

According to an aspect of the present invention, in order to achieve the above-mentioned object, there is provided a base station including a communication unit for communicating with a mobile terminal via a relay link between the base station and a relay device and an access link between the relay device and the mobile terminal, and a selection unit for selecting an allocation pattern of an uplink of the relay link, a downlink of the relay link, an uplink of the access link, and a downlink of the access link to frequency-time blocks from a plurality of allocation patterns that are different in delay characteristics occurring between the base station and the mobile terminal.

The communication unit may receive information indicating an allocation pattern that the relay device is compatible with, and the selection unit may select the allocation pattern that the relay device is compatible with from the plurality of allocation patterns.

The selection unit may select the allocation pattern according to delay characteristics required for communication between the base station and the mobile terminal.

One radio frame may be formed from a plurality of subframes, and a time slot of each of the frequency-time blocks may correspond to a time slot of a subframe.

One radio frame may be formed from a plurality of subframes formed from a plurality of slots, and a time slot of each of the frequency-time blocks may correspond to a time slot of a slot.

The plurality of allocation patterns may include an allocation pattern where frequency-time blocks of the downlink of the relay link and the downlink of the access link are different in time, and frequency-time blocks of the uplink of the access link and the uplink of the relay link are different in time, and an allocation pattern where frequency-time blocks of the downlink of the relay link and the downlink of the access link are different in frequency, and frequency-time blocks of the uplink of the access link and the uplink of the relay link are different in frequency.

The plurality of allocation patterns may include an allocation pattern where frequency-time blocks of the uplink of the relay link, the downlink of the relay link, the uplink of the access link, and the downlink of the access link are same in time but different in frequency.

The plurality of allocation patterns may include an allocation pattern where frequency-time blocks of the uplink of the relay link, the downlink of the relay link, the uplink of the access link, and the downlink of the access link are same in frequency but different in time.

The plurality of allocation patterns may include an allocation pattern where frequency-time blocks of the downlink of the relay link and the downlink of the access link are different in time and frequency, and frequency-time blocks of the uplink of the access link and the uplink of the relay link are different in time and frequency.

According to another aspect of the present invention, in order to achieve the above-mentioned object, there is provided a communication system including a mobile terminal, a relay device, and a base station including a communication unit for communicating with the mobile terminal via a relay link between the base station and the relay device and an access link between the relay device and the mobile terminal, and a selection unit for selecting an allocation pattern of an uplink of the relay link, a downlink of the relay link, an uplink of the access link, and a downlink of the access link to frequency-time blocks from a plurality of allocation patterns that are different in delay characteristics occurring between the base station and the mobile terminal.

According to another aspect of the present invention, in order to achieve the above-mentioned object, there is provided a mobile terminal. The mobile terminal communicates with a base station via a relay device according to an allocation pattern selected by a selection unit, the base station including a communication unit for communicating with the mobile terminal via a relay link between the base station and the relay device and an access link between the relay device and the mobile terminal, and the selection unit for selecting an allocation pattern of an uplink of the relay link, a downlink of the relay link, an uplink of the access link, and a downlink of the access link to frequency-time blocks from a plurality of allocation patterns that are different in delay characteristics occurring between the base station and the mobile terminal.

According to another aspect of the present invention, in order to achieve the above-mentioned object, there is provided a relay device. The relay device relays communication between a base station and a mobile terminal according to an allocation pattern selected by a selection unit, the base station including a communication unit for communicating with the mobile terminal via a relay link between the base station and the relay device and an access link between the relay device and the mobile terminal, and the selection unit for selecting an allocation pattern of an uplink of the relay link, a downlink of the relay link, an uplink of the access link, and a downlink of the access link to frequency-time blocks from a plurality of allocation patterns that are different in delay characteristics occurring between the base station and the mobile terminal.

Advantageous Effects of Invention

As described above, according to the present invention, each link can be allocated to a frequency-time block according to any of a plurality of link allocation patterns with different delay characteristics.

DESCRIPTION OF EMBODIMENTS

Figure 1:
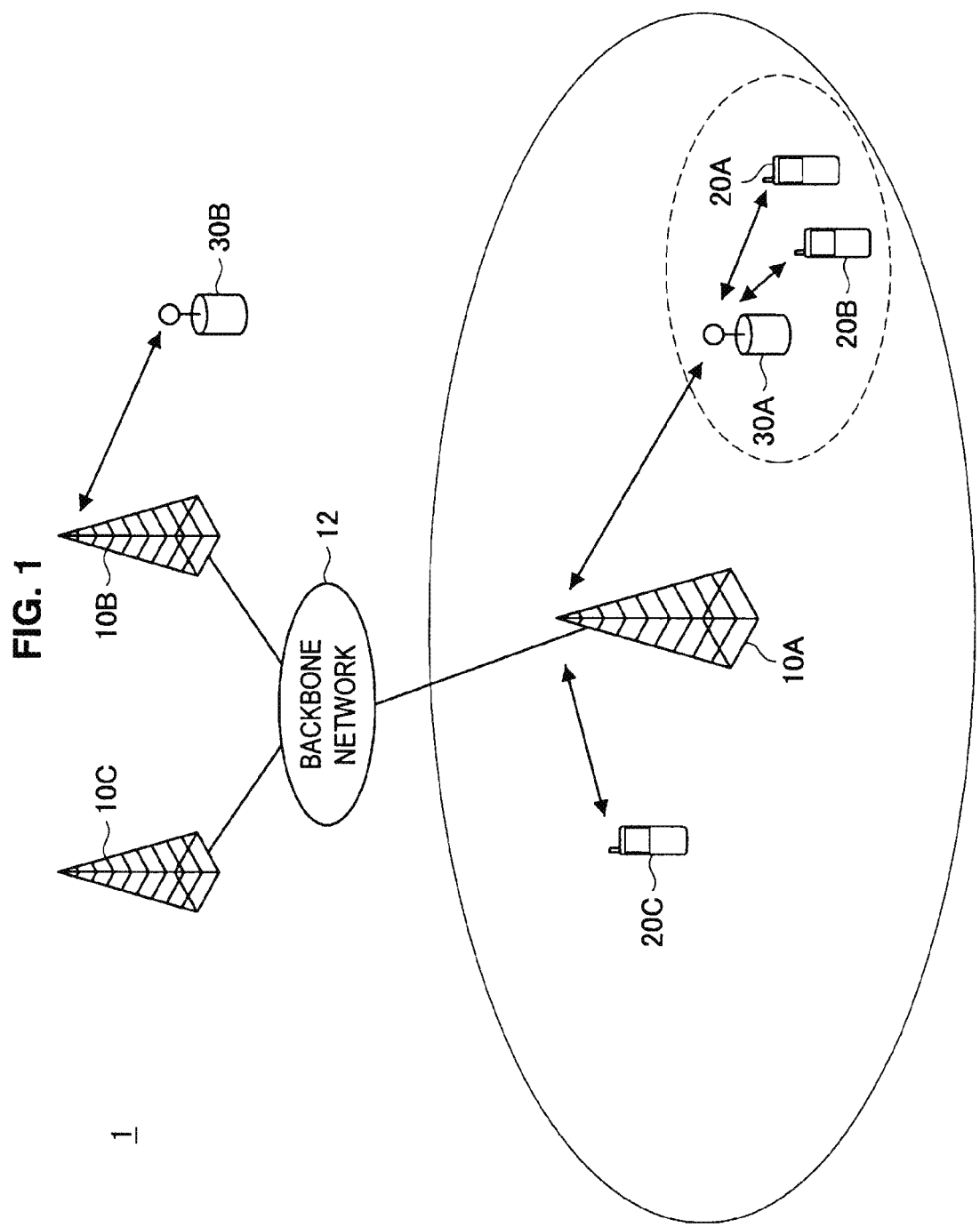
FIG. 1 is an explanatory diagram showing a configuration of a communication system 1 according to an embodiment of the present invention.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Also, in this specification and the drawings, a plurality of structural elements having substantially the same functional configuration may be distinguished from each other by each having a different letter added to the same reference numeral. For example, a plurality of elements having substantially the same functional configuration are distinguished from each other as necessary as mobile terminals 20A, 20B, and 20C. However, if it is not particularly necessary to distinguish each of a plurality of structural elements having substantially the same functional configuration, only the same reference numeral is assigned. For example, if it is not particularly necessary to distinguish between the mobile terminals 20A, 20B, and 20C, they are simply referred to as the mobile terminal 20.

Furthermore, the "Description of Embodiments" will be described according to the following item order.

1. Overview of Communication System
2. Configuration of Mobile Terminal
3. Configuration of Relay Device
4. Configuration of Base Station
5. Operation of Communication System
6. Summary <1. Overview of Communication System>

First, a communication system 1 according to an embodiment of the present invention will be briefly described with reference to FIGS. 1 to 3.

FIG. 1 is an explanatory diagram showing the configuration of the communication system 1 according to the embodiment of the present invention. As shown in FIG. 1, the communication system 1 according to the embodiment of the present invention includes a plurality of base stations 10A, 10B, and 10C, a backbone network 12, a plurality of mobile terminals 20A, 20B, and 20C, and a plurality of relay devices 30A and 30B.

The plurality of base stations 10A, 10B, and 10C manage schedule information for communicating with the mobile terminals 20 that are present in their radio wave coverages. The plurality of base stations 10A, 10B, and 10C communicate with the mobile terminals 20 present in their radio wave coverages according to the schedule information.

For example, the base station 10A manages schedule information on frequency-time for communicating with the mobile terminal 20C present in the radio wave coverage of the base station 10A. The base station 10A communicates with the mobile terminal 20C present in the radio wave coverage of the base station 10A according to the schedule information described above.

Also, the plurality of base stations 10A, 10B, and 10C are also capable of communicating with the mobile terminals 20 via relay devices 30 present in their radio wave coverages. In this case, the plurality of base stations 10A, 10B, and 10C manage schedule information for communicating with the relay devices 30, and schedule information for the relay devices 30 and the mobile terminals 20 to communicate with each other.

For example, the base station 10A manages schedule information on frequency-time for communicating with a relay device 30A present in the radio wave coverage of the base station 10A, and manages schedule information on frequency-time for the relay device 30A and the mobile terminals 20A and 20B to communicate with each other. The base station 10A communicates with the relay device 30A according to the schedule information described above.

Additionally, in the present specification, an explanation will be given placing emphasis on a case where frequency-time schedule management is performed by the base station 10, but the present invention is not limited to such an example. For example, the frequency-time schedule management may be performed by the base station 10 and the relay device 30 working in cooperation with each other, or may be performed by the base station 10, the relay device 30, and the mobile terminal 20 working in cooperation with each other, or may be performed by the relay device 30.

Furthermore, the plurality of base stations 10A, 10B, and 10C are connected via the backbone network 12. The plurality of base stations 10A, 10B, and 10C are capable of exchanging the schedule information that each manages via this backbone network 12, for example.

The relay device 30 relays the communication between the base station 10 and the mobile terminal 20 according to the schedule information on frequency-time managed by the base station 10. Specifically, in the downlink, the relay device 30 receives a signal transmitted from the base station 10, and transmits the amplified signal to the mobile terminal 20 using the frequency-time that is according to the schedule information. By performing such relaying, the relay device 30 can increase the signal-to-noise ratio than when directly transmitting the signal from the base station 10 to the mobile terminal 20 near the cell edge.

Similarly, also in the uplink, the relay device 30 relays a signal transmitted from the mobile terminal 20 to the base station 10 according to the schedule information on frequency-time managed by the base station 10, and thereby maintains a high signal-to-noise ratio. Additionally, an example is shown in FIG. 1 where only the relay device 30A is present in the cell provided by the base station 10A, but a plurality of relay devices 30 may be present in the cell provided by the base station 10A. Link names will now be organized with reference to FIG. 2.

Figure 2:
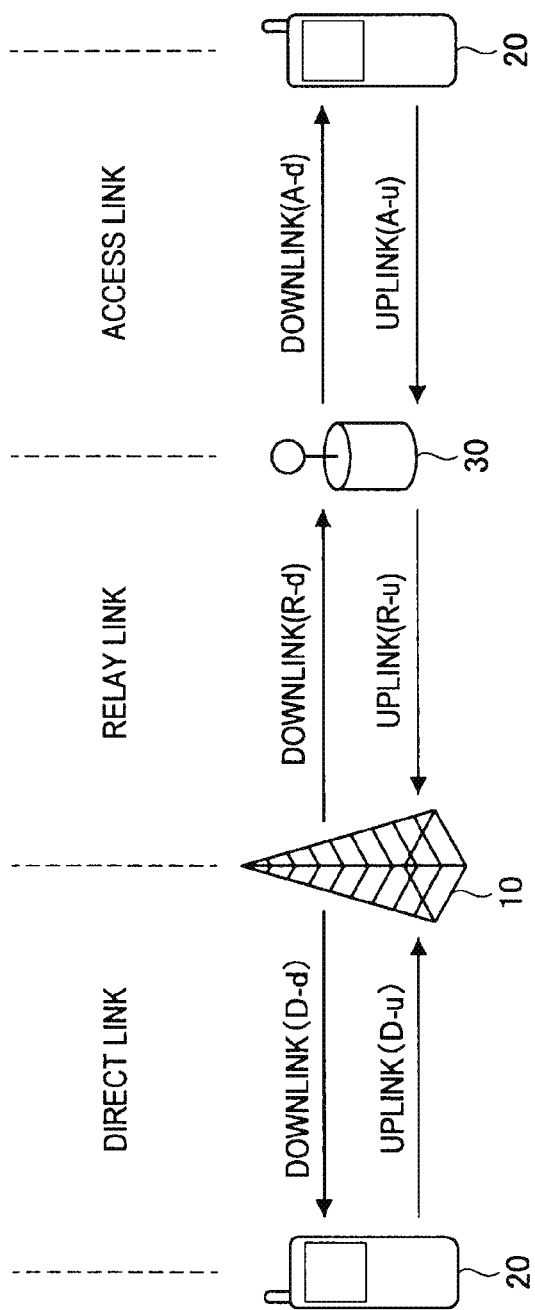
FIG. 2 is an explanatory diagram showing each link in the communication system 1 according to the embodiment of the present invention.

FIG. 2 is an explanatory diagram showing each link in the communication system 1 according to the embodiment of the present invention. As shown in FIG. 2, a direct communication path between the base station 10 and the mobile terminal 20 is referred to as a direct link. Also, the downlink of this direct link is referred to as a direct downlink (D-d), and the uplink of this direct link is referred to as a direct uplink (D-u).

Also, the communication path between the base station 10 and the relay device 30 is referred to as a relay link, and the downlink of this relay link is referred to as a relay downlink (R-d), and the uplink of this relay link is referred to as a relay uplink (R-u). Furthermore, the communication path between the relay device 30 and the base station 10 is referred to as an access link, and the downlink of this access link is referred to as an access downlink (A-d), and the uplink of this access link is referred to as an access uplink (A-u).

The communication system 1 will be again described with reference to FIG. 1. As described above, the mobile terminal 20 included in the communication system 1 communicates with the base station 10 directly or via the relay device 30, according to the schedule information managed by the base station 10. Additionally, as the data to be transmitted/received by the mobile terminal 20, audio data, music data such as music, a lecture, a radio program, or the like, still image data such as a photograph, a document, a painting, a diagram, or the like, video data such as a movie, a television program, a video program, a game image, or the like, may be cited.

Now, the configuration of a radio frame used in the communication system 1 according to the present embodiment will be described with reference to FIG. 3.

Figure 3:
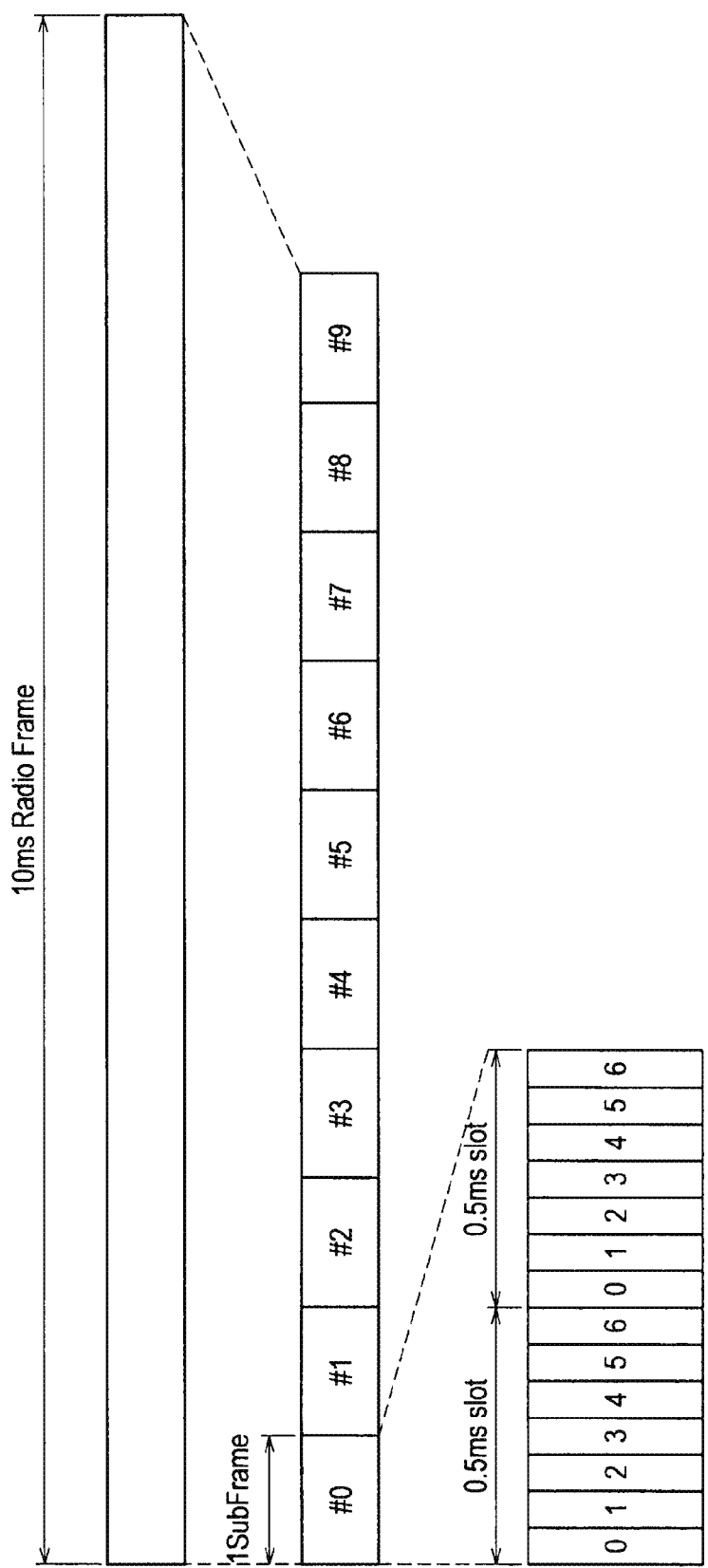
FIG. 3 is an explanatory diagram showing an example configuration of a radio frame used in the communication system 1 according to the embodiment.

FIG. 3 is an explanatory diagram showing an example configuration of a radio frame used in the communication system 1 according to the present embodiment. As shown in FIG. 3, the length of each radio frame is 10 ms. Also, each radio frame is formed from ten subframes #0 to #9 whose lengths are 1 ms.

Also, each subframe is formed from two 0.5 ms slots, and each 0.5 ms slot is formed from seven OFDM (orthogonal frequency division multiplexing) symbols.

Also, the fifth and sixth OFDM symbols of the first 0.5 ms slots included in the subframes #0 and #5 are used for transmission of reference signals for synchronization. The mobile terminal 20 performs a cell search and a synchronization process based on this reference signal transmitted from the base station 10 or the relay station 30.

Additionally, the base station 10 allots time on a per-0.5 ms slot basis for communication with the mobile terminal 20. Furthermore, to separate the uplink and the downlink, FDD (Frequency Division Duplex) and TDD (Time Division Duplex) are used. In the case of TDD, it is possible to select for each subframe whether to use the subframe for uplink or downlink.

<2. Configuration of Mobile Terminal>

In the foregoing, the communication system 1 according to the present embodiment has been briefly described with reference to FIGS. 1 to 3. Next, the configuration of the mobile terminal 20 included in the communication system 1 according to the present embodiment will be described with reference to FIG. 4.

Figure 4:
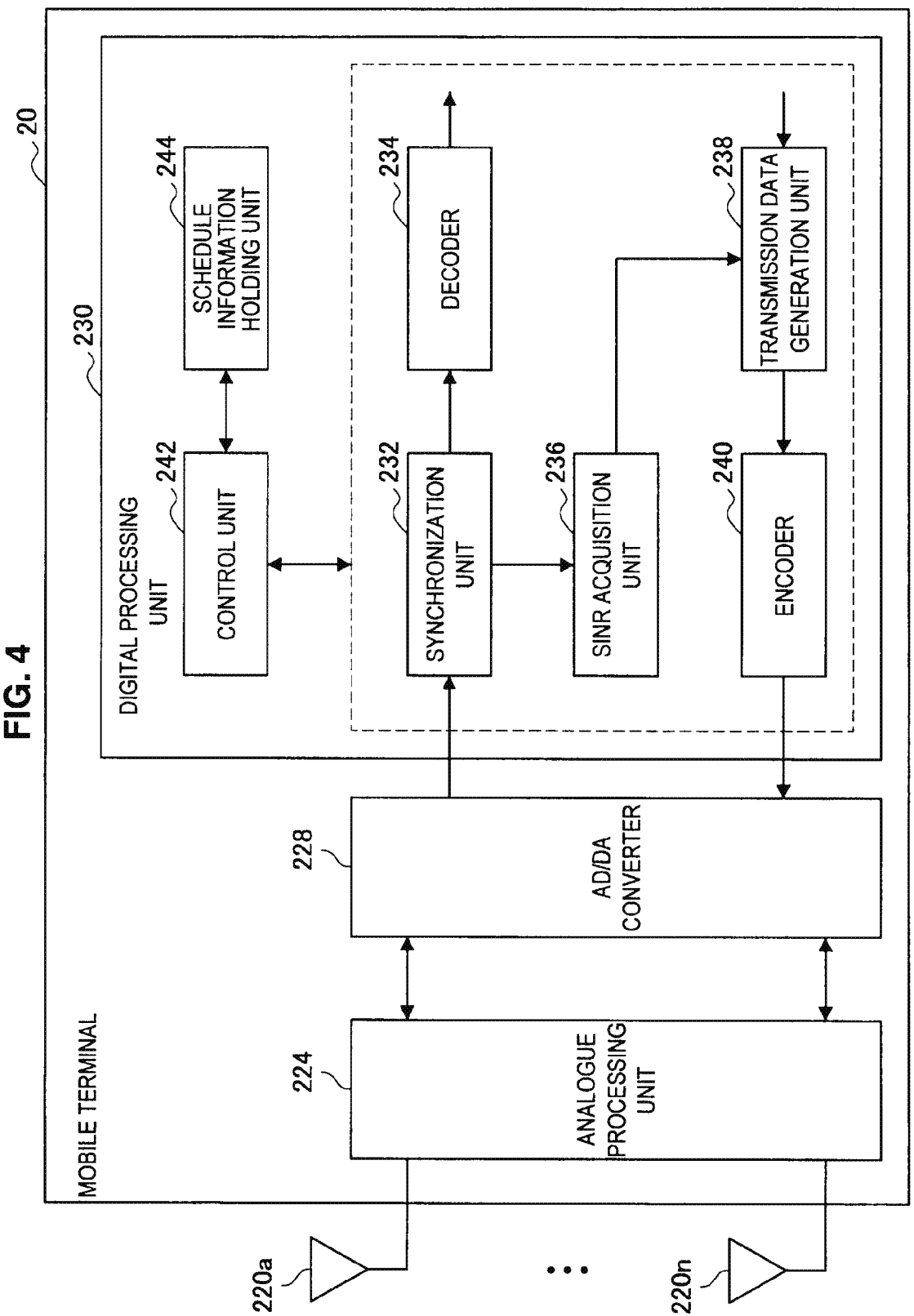
FIG. 4 is a functional block diagram showing a configuration of a mobile terminal 20.

FIG. 4 is a functional block diagram showing the configuration of the mobile terminal 20. As shown in FIG. 4, the mobile terminal 20 includes a plurality of antennas 220a to 220n, an analogue processing unit 224, an AD/DA converter 228, and a digital processing unit 230.

Each of the plurality of antennas 220a to 220n receives a radio signal from the base station 10 or the relay device 30 and acquires an electrical high-frequency signal, and supplies the high-frequency signal to the analogue processing unit 224. Also, each of the plurality of antennas 220a to 220n transmits a radio signal to the base station 10 or the relay device 30 based on the high-frequency signal supplied from the analogue processing unit 224. Since the mobile terminal 20 is provided with the plurality of antennas 220a to 220n as described, it is capable of performing MIMO (Multiple Input Multiple Output) communication or diversity communication.

The analogue processing unit 224 converts the high-frequency signals supplied from the plurality of antennas 220a to 220n into baseband signals by performing analogue processing such as amplification, filtering, down-conversion, or the like. Also, the analogue processing unit 224 converts a baseband signal supplied from the AD/DA converter 228 into a high-frequency signal.

The AD/DA converter 228 converts the analogue baseband signal supplied from the analogue processing unit 224 into a digital format, and supplies the same to the digital processing unit 230. Also, the AD/DA converter 228 converts a digital baseband signal supplied from the digital processing unit 230 into an analogue format, and supplies the same to the analogue processing unit 224.

The digital processing unit 230 includes a synchronization unit 232, a decoder 234, a SINR (Signal to Interference plus Noise Ratio) acquisition unit 236, a transmission data generation unit 238, an encoder 240, a control unit 242, and a schedule information holding unit 244. Among these, the synchronization unit 232, the decoder 234, the encoder 240, and the like function, together with the plurality of antennas 220a to 220n, the analogue processing unit 224, and the AD/DA converter 228, as a communication unit for communicating with the base station 10 and the relay device 30.

The synchronization unit 232 is supplied, from the AD/DA converter 228, with a reference signal transmitted from the base station 10 or the relay device 30, and performs a synchronization process of a radio frame based on the reference signal. Specifically, the synchronization unit 232 performs synchronization of the radio frame by computing the correlation between the reference signal and a known sequence pattern and detecting the peak position of the correlation.

The decoder 234 decodes a baseband signal supplied from the AD/DA converter 228 and obtains received data. Additionally, the decoding may include a MIMO reception process and an OFDM demodulation process, for example.

The SINR acquisition unit 236 acquires the level of SINR with respect to the relay device 30 from the correlation of the reference signal obtained by the synchronization unit 232. Here, each relay device 30 transmits a reference signal having any of a plurality of sequence patterns. Therefore, the SINR acquisition unit 236 can acquire the SINR for each relay device 30 based on the difference between the sequence patterns of the reference signals.

The transmission data generation unit 238 is supplied, from the SINR acquisition unit 236, with information indicating the SINR of each relay device 30, and generates transmission data including the information and supplies the same to the encoder 240.

The encoder 240 encodes the transmission data supplied from the transmission data generation unit 238, and supplies the same to the AD/DA converter 228. Additionally, the encoding may include a MIMO transmission process and an OFDM demodulation process, for example.

The control unit 242 controls transmission processing and reception processing at the mobile terminal 20 according to the schedule information held in the schedule information holding unit 244. For example, the mobile terminal 20 performs, based on the control of the control unit 242, transmission processing and reception processing using frequency-time blocks indicated by the schedule information.

The schedule information holding unit 244 holds the schedule information managed by the base station 10. This schedule information indicates a frequency-time block to be used for the access downlink or a frequency-time block to be used for the access uplink, for example.

Additionally, the schedule information of the uplink and the downlink is included in a PDCH (Physical Downlink Control Channel) which is a downlink control channel. Additionally, this PDCH is transmitted using the first one to three OFDM symbols of a subframe, in the radio frame, allocated to the downlink.

<3. Configuration of Relay Device>

Next, the configuration of the relay device 30 will be described with reference to FIG. 5.

Figure 5:
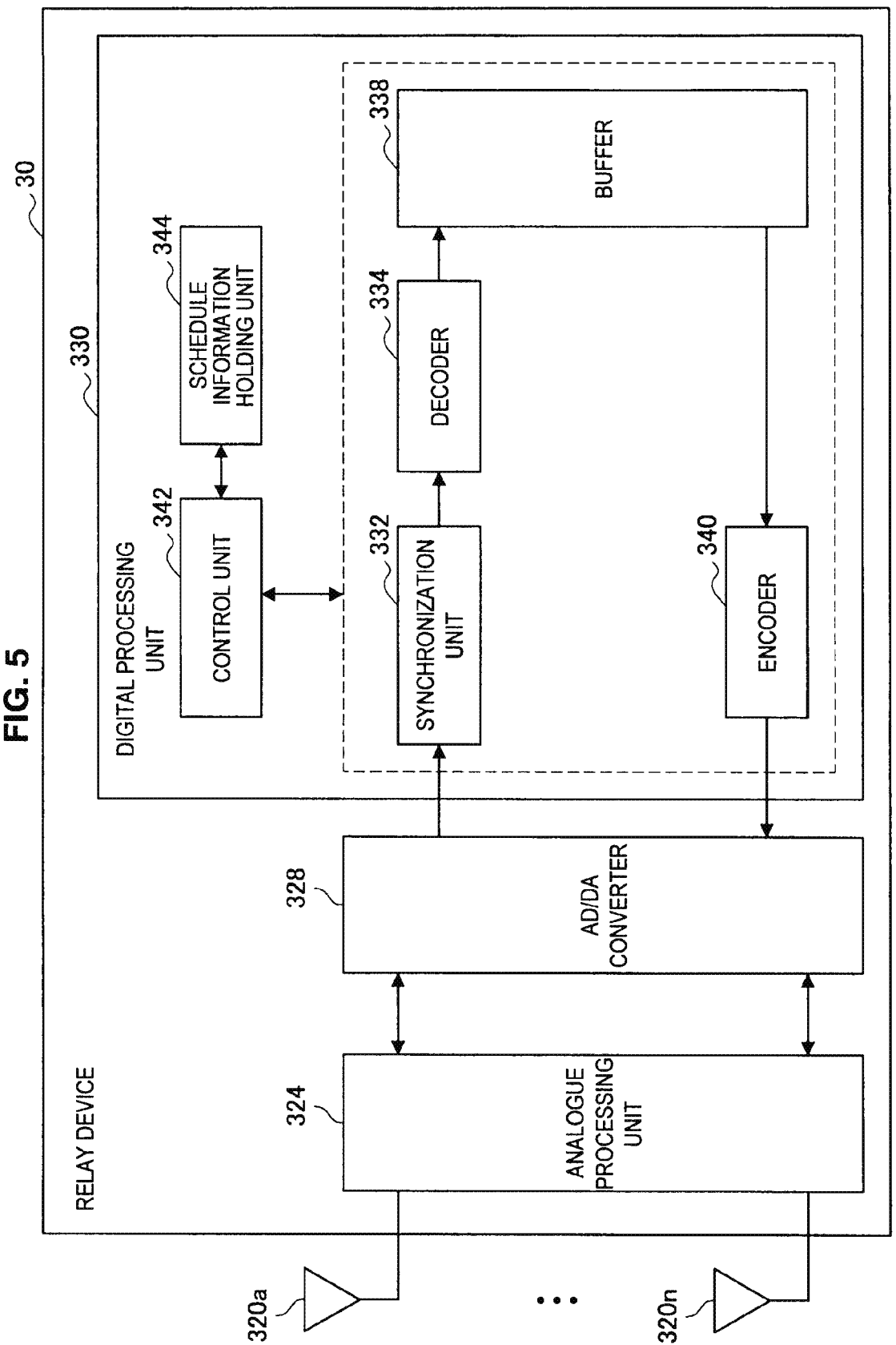
FIG. 5 is a functional block diagram showing a configuration of a relay device 30.

FIG. 5 is a functional block diagram showing the configuration of the relay device 30. As shown in FIG. 5, the relay device 30 includes a plurality of antennas 320a to 320n, an analogue processing unit 324, an AD/DA converter 328, and a digital processing unit 330.

Each of the plurality of antennas 320a to 320n receives a radio signal from the base station 10 or the mobile terminal 20 and acquires an electrical high-frequency signal, and supplies the high-frequency signal to the analogue processing unit 324. Also, each of the plurality of antennas 320a to 320n transmits a radio signal to the base station 10 or the mobile terminal 20 based on the high-frequency signal supplied from the analogue processing unit 324. Since the relay device 30 is provided with the plurality of antennas 320a to 320n as described, it is capable of performing MIMO communication or diversity communication.

The analogue processing unit 324 converts the high-frequency signals supplied from the plurality of antennas 320a to 320n into baseband signals by performing analogue processing such as amplification, filtering, down-conversion, or the like. Also, the analogue processing unit 324 converts a baseband signal supplied from the AD/DA converter 328 into a high-frequency signal.

The AD/DA converter 328 converts the analogue baseband signal supplied from the analogue processing unit 324 into a digital format, and supplies the same to the digital processing unit 330. Also, the AD/DA converter 328 converts a digital baseband signal supplied from the digital processing unit 330 into an analogue format, and supplies the same to the analogue processing unit 324.

The digital processing unit 330 includes a synchronization unit 332, a decoder 334, a buffer 338, an encoder 340, a control unit 342, and a schedule information holding unit 344. Among these, the synchronization unit 332, the decoder 334, the encoder 340, and the like function, together with the plurality of antennas 320a to 320n, the analogue processing unit 324, and the AD/DA converter 328, as a communication unit for communicating with the base station 10 and the mobile terminal 20.

The synchronization unit 332 is supplied, from the AD/DA converter 328, with a reference signal transmitted from the base station 10, and performs a synchronization process of a radio frame based on the reference signal. Specifically, the synchronization unit 332 performs synchronization of the radio frame by computing the correlation between the reference signal and a known sequence pattern and detecting the peak position of the correlation.

The decoder 334 decodes a baseband signal supplied from the AD/DA converter 328 and obtains relay data for the base station 10 or the mobile terminal 20. Additionally, the decoding may include a MIMO reception process, an OFDM demodulation process, an error correction process, and the like, for example.

The buffer 338 temporarily holds the relay data, obtained by the decoder 334, for the base station 10 or the mobile terminal 20. Then, the relay data for the mobile terminal 20 is read out, by the control of the control unit 342, from the buffer 338 to the encoder 340 in the transmission time of the access downlink to the mobile terminal 20. Likewise, the relay data for the base station 10 is read out, by the control of the control unit 342, from the buffer 338 to the encoder 340 in the transmission time of the relay uplink to the base station 10.

The encoder 340 encodes the data supplied from the buffer 338, and supplies the same to the AD/DA converter 328. Additionally, the encoding may include a MIMO transmission process and an OFDM demodulation process, for example.

The control unit 342 controls transmission processing and reception processing at the relay device 30 according to the schedule information held in the schedule information holding unit 344. For example, the relay device 30 performs, based on the control of the control unit 342, transmission processing and reception processing using frequency-time blocks indicated by the schedule information.

The schedule information holding unit 344 holds the schedule information managed by the base station 10. This schedule information indicates frequency-time blocks to be used respectively for the relay downlink, the access downlink, the access uplink, and the relay uplink, for example.

<4. Configuration of Base Station>

Next, the configuration of the base station 10 will be described with reference to FIGS. 6 to 16.

Figure 6:
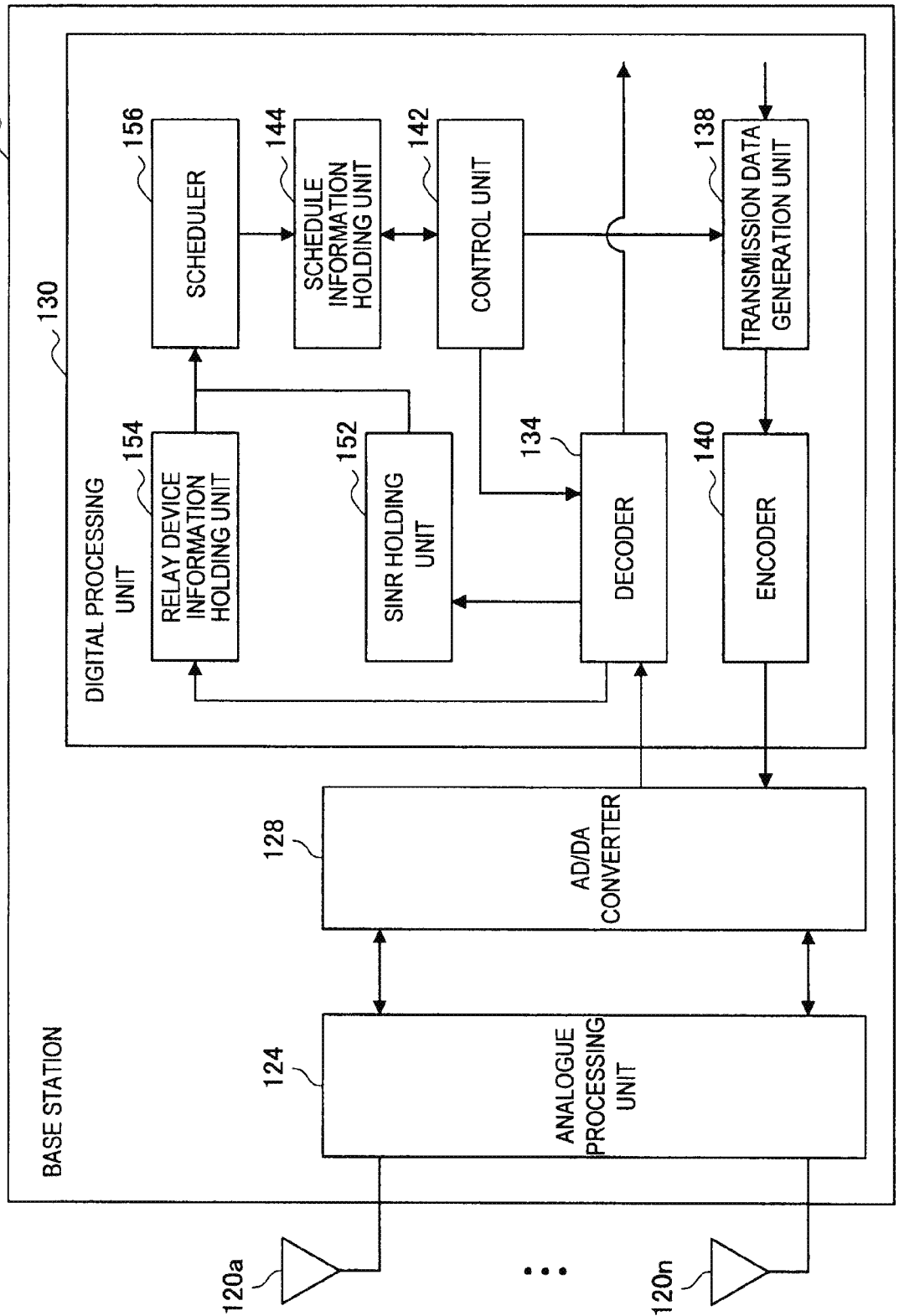
FIG. 6 is a functional block diagram showing a configuration of a base station 10.

FIG. 6 is a functional block diagram showing the configuration of the base station 10. As shown in FIG. 6, the base station 10 includes a plurality of antennas 120a to 120n, an analogue processing unit 124, an AD/DA converter 128, and a digital processing unit 130.

Each of the plurality of antennas 120a to 120n receives a radio signal from the relay device 30 or the mobile terminal 20 and acquires an electrical high-frequency signal, and supplies the high-frequency signal to the analogue processing unit 124. Also, each of the plurality of antennas 120a to 120n transmits a radio signal to the relay device 30 or the mobile terminal 20 based on the high-frequency signal supplied from the analogue processing unit 124. Since the base station 10 is provided with the plurality of antennas 120a to 120n as described, it is capable of performing MIMO communication or diversity communication.

The analogue processing unit 124 converts the high-frequency signals supplied from the plurality of antennas 120a to 120n into baseband signals by performing analogue processing such as amplification, filtering, down-conversion, or the like. Also, the analogue processing unit 124 converts a baseband signal supplied from the AD/DA converter 128 into a high-frequency signal.

The AD/DA converter 128 converts the analogue baseband signal supplied from the analogue processing unit 124 into a digital format, and supplies the same to the digital processing unit 130. Also, the AD/DA converter 128 converts a digital baseband signal supplied from the digital processing unit 130 into an analogue format, and supplies the same to the analogue processing unit 124.

The digital processing unit 130 includes a decoder 134, a transmission data generation unit 138, an encoder 140, a control unit 142, a schedule information holding unit 144, a SINR holding unit 152, a relay device information holding unit 154, and a scheduler 156. Among these, the decoder 134, the encoder 140, and the like function, together with the plurality of antennas 120a to 120n, the analogue processing unit 124, and the AD/DA converter 128, as a communication unit for communicating with the relay device 30 and the mobile terminal 20.

The decoder 134 decodes a baseband signal supplied from the AD/DA converter 128 and obtains received data. Additionally, the decoding may include a MIMO reception process, an OFDM demodulation process, an error correction process, and the like, for example.

The transmission data generation unit 138 generates transmission data including schedule information scheduled by the scheduler 156. Additionally, the schedule information is included in the PDCH arranged at the beginning of the subframes as described above.

The encoder 140 encodes the transmission data supplied from the transmission data generation unit 138, and supplies the same to the AD/DA converter 128. Additionally, the encoding may include a MIMO transmission process and an OFDM demodulation process, for example.

The control unit 142 controls transmission processing and reception processing at the base station 10 according to the schedule information held in the schedule information holding unit 144. For example, the base station 10 performs, based on the control of the control unit 142, transmission processing and reception processing using frequency-time blocks indicated by the schedule information.

The schedule information holding unit 144 holds the schedule information determined by the scheduler 156.

The scheduler 156 (selection unit) schedules relay link communication with the relay device 30, and access link communication between the relay device 30 and the mobile terminal 20. Here, the scheduler 156 divides the resources for the relay downlink, the access downlink, the access uplink, and the relay uplink by frequency/time from the standpoint of interference avoidance. In the following, allocation patterns allowing division of resources by frequency/time will be described with reference to FIGS. 7 to 14.

(Allocation Pattern 1)

Figure 7:
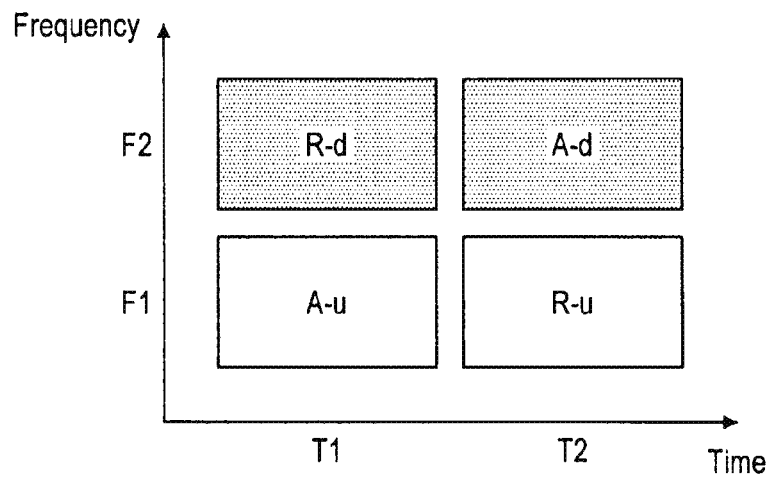
FIG. 7 is an explanatory diagram showing an allocation pattern 1 for each link.

FIG. 7 is an explanatory diagram showing an allocation pattern 1 for each link. As shown in FIG. 7, according to the allocation pattern 1, the relay downlink (R-d) is allocated to a frequency-time block defined by frequency F2/slot T1, the access downlink (A-d) is allocated to a frequency-time block defined by frequency F2/slot T2, the access uplink (A-u) is allocated to a frequency-time block defined by frequency F1/slot T1, and the relay uplink (R-u) is allocated to a frequency-time block defined by frequency F1/slot T2. Additionally, in FIGS. 7 to 16, frequency-time blocks to which the downlinks are allocated are coloured so as to be distinguished from frequency-time blocks to which the uplinks are allocated. Also, the frequency-time block may be a resource block which is the minimum unit for link allocation or a group of resource blocks.

According to this allocation pattern 1, the base station 10 transmits data to the relay device 30 via the relay downlink at frequency F2/slot T1. Then, the relay device 30 receives the data transmitted via the relay downlink, holds it in the buffer 338 as relay data, and then transmits the relay data to the mobile terminal 20 via the access downlink at frequency F2/slot T2.

Also, the mobile terminal 20 transmits data to the relay device 30 via the access uplink at frequency F1/slot T1. Then, the relay device 30 receives the data transmitted via the access uplink, holds it in the buffer 338 as relay data, and then transmits the relay data to the base station 10 via the relay uplink at frequency F1/slot T2.

In this manner, according to the allocation pattern 1, the uplink and the downlink are separated by frequency, and the relay link and the access link in the same direction are separated by time, and thus interference between each link can be suppressed.

(Allocation Pattern 2)

Figure 8:
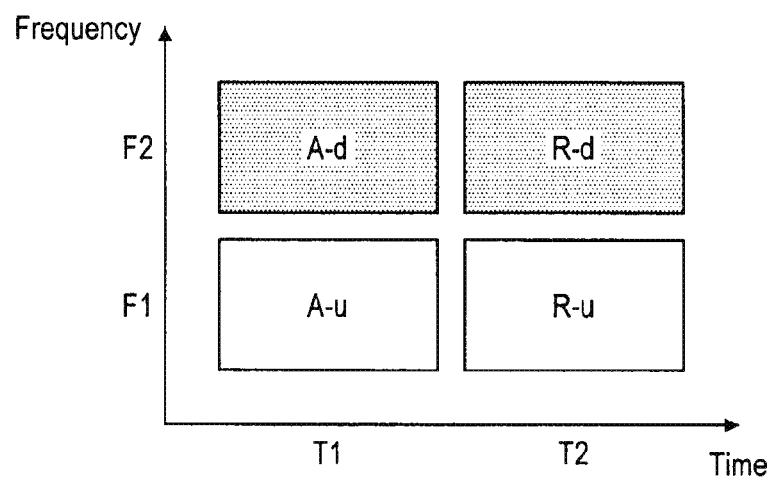
FIG. 8 is an explanatory diagram showing an allocation pattern 2 for each link.

FIG. 8 is an explanatory diagram showing an allocation pattern 2 for each link. As shown in FIG. 8, according to the allocation pattern 2, the access downlink (A-d) is allocated to the frequency-time block defined by frequency F2/slot T1, the relay downlink (R-d) is allocated to the frequency-time block defined by frequency F2/slot T2, the access uplink (A-u) is allocated to the frequency-time block defined by frequency F1/slot T1, and the relay uplink (R-u) is allocated to the frequency-time block defined by frequency F1/slot T2.

According to this allocation pattern 2, the relay device 30 transmits relay data held in the buffer 338 to the mobile terminal 20 via the access downlink at frequency F2/slot T1. Also, the base station 10 transmits data to the relay device 30 via the relay downlink at frequency F2/slot T1.

Also, the mobile terminal 20 transmits data to the relay device 30 via the access uplink at frequency F1/slot T1. Then, the relay device 30 receives the data transmitted via the access uplink, holds it in the buffer 338 as relay data, and transmits the relay data to the base station 10 via the relay uplink at frequency F1/slot T2.

In this manner, also according to the allocation pattern 2, the uplink and the downlink are separated by frequency, and the relay link and the access link in the same direction are separated by time, and thus interference between each link can be suppressed.

(Allocation Pattern 3)

Figure 9:
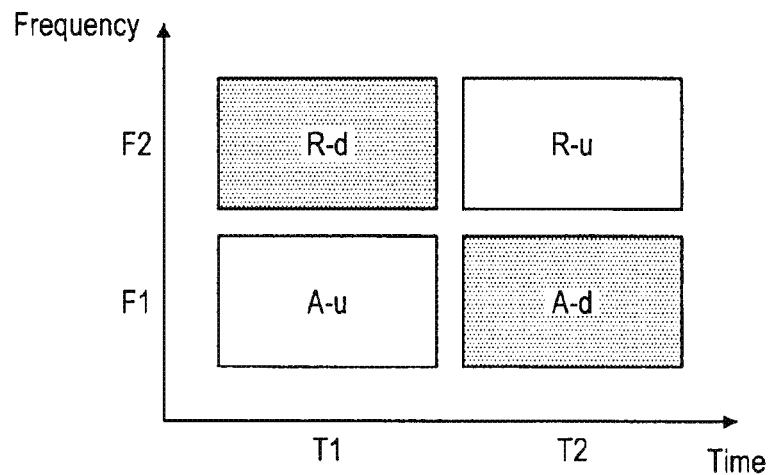
FIG. 9 is an explanatory diagram showing an allocation pattern 3 for each link.

FIG. 9 is an explanatory diagram showing an allocation pattern 3 for each link. As shown in FIG. 9, according to the allocation pattern 3, the relay downlink (R-d) is allocated to the frequency-time block defined by frequency F2/slot T1, the access downlink (A-d) is allocated to the frequency-time block defined by frequency F1/slot T2, the access uplink (A-u) is allocated to the frequency-time block defined by frequency F1/slot T1, and the relay uplink (R-u) is allocated to the frequency-time block defined by frequency F2/slot T2.

According to this allocation pattern 3, the base station 10 transmits data to the relay device 30 via the relay downlink at frequency F2/slot T1. Then, the relay device 30 receives the data transmitted via the relay downlink, holds it in the buffer 338 as relay data, and then transmits the relay data to the mobile terminal 20 via the access downlink at frequency F1/slot T2.

Furthermore, the mobile terminal 20 transmits data to the relay device 30 via the access uplink at frequency F1/slot T1. Then, the relay device 30 receives the data transmitted via the access uplink, holds it in the buffer 338 as relay data, and then transmits the relay data to the base station 10 via the relay uplink at frequency F2/slot T2.

In this manner, according to the allocation pattern 3, the uplink and the downlink are separated by frequency, and the relay link and the access link in the same direction are separated by both frequency and time, and thus interference between each link can be suppressed.

(Allocation Pattern 4)

Figure 10:
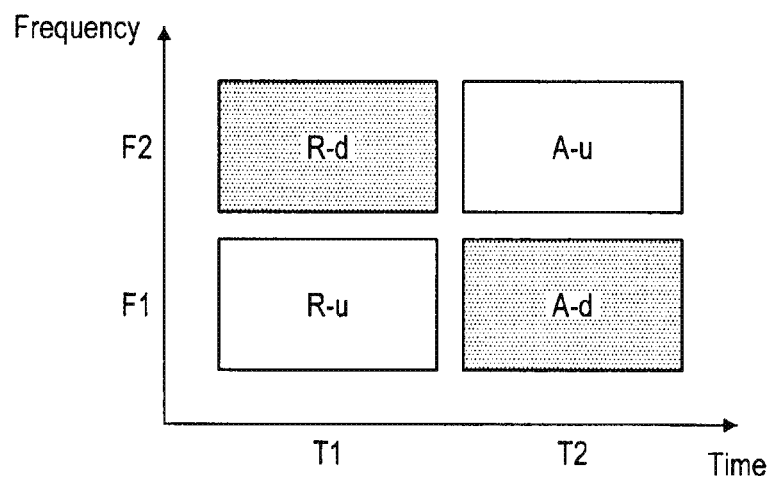
FIG. 10 is an explanatory diagram showing an allocation pattern 4 for each link.

FIG. 10 is an explanatory diagram showing an allocation pattern 4 for each link. As shown in FIG. 10, according to the allocation pattern 4, the relay downlink (R-d) is allocated to the frequency-time block defined by frequency F2/slot T1, the access downlink (A-d) is allocated to the frequency-time block defined by frequency F1/slot T2, the access uplink (A-u) is allocated to the frequency-time block defined by frequency F2/slot T2, and the relay uplink (R-u) is allocated to the frequency-time block defined by frequency F1/slot T1.

According to this allocation pattern 4, the base station 10 transmits data to the relay device 30 via the relay downlink at frequency F2/slot T1. Then, the relay device 30 receives the data transmitted via the relay downlink, holds it in the buffer 338 as relay data, and then transmits the relay data to the mobile terminal 20 via the access downlink at frequency F1/slot T2.

Furthermore, the relay device 30 transmits the relay data held in the buffer 338 to the base station 10 via the relay uplink at frequency F1/slot T1. Also, the mobile terminal 20 transmits data to the relay device 30 via the access uplink at frequency F2/slot T2.

In this manner, also according to the allocation pattern 4, the uplink and the downlink are separated by frequency, and the relay link and the access link in the same direction are separated by both frequency and time, and thus interference between each link can be suppressed.

(Allocation Pattern 5)

Figure 11:
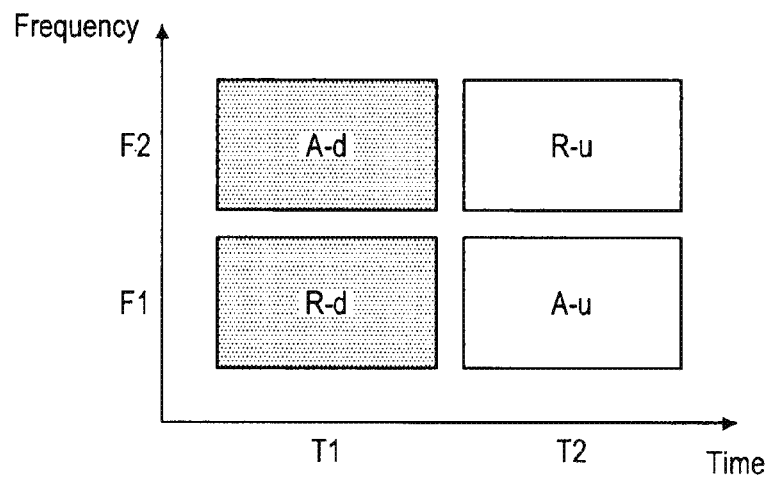
FIG. 11 is an explanatory diagram showing an allocation pattern 5 for each link.

FIG. 11 is an explanatory diagram showing an allocation pattern 5 for each link. As shown in FIG. 11, according to the allocation pattern 5, the relay downlink (R-d) is allocated to the frequency-time block defined by frequency F1/slot T1, the access downlink (A-d) is allocated to the frequency-time block defined by frequency F2/slot T1, the access uplink (A-u) is allocated to the frequency-time block defined by frequency F1/slot T2, and the relay uplink (R-u) is allocated to the frequency-time block defined by frequency F2/slot T2.

As described above, unlike the allocation patterns 1 to 4, according to the allocation pattern 5, the relay link and the access link are separated by frequency. Accordingly, the delay that occurs between the downlink of the relay link and the downlink of the access link can be reduced from a per-slot basis to a per-OFDM-symbol basis. Likewise, the delay that occurs between the uplink of the access link and the uplink of the relay link can be reduced from a per-slot basis to a per-OFDM-symbol basis.

Specifically, the base station 10 transmits data to the relay device 30 via the relay downlink at frequency F1/slot T1. Then, the relay device 30 performs, using frequency F2/slot T1, decoding, buffering, encoding, and transmission to the mobile terminal 20 via the access downlink of data received via the relay downlink, with the amount of delay on a per-OFDM-symbol basis from the reception. Additionally, the amount of delay may be variable between one OFDM symbol to a plurality of OFDM symbols.

Also, the mobile terminal 20 transmits data to the relay device 30 via the access uplink at frequency F1/slot T2. Then, the relay device 30 performs, using frequency F2/slot T2, decoding, buffering, encoding, and transmission to the base station 10 via the relay uplink of data received via the access uplink, with the amount of delay on a per-OFDM-symbol basis from the reception.

As described, according to the allocation pattern 5, the relay link and the access link are separated by frequency (FDD), and the uplink and the downlink are separated by time (TDD). Therefore, according to the allocation pattern 5, the delay that occurs between the base station 10 and the mobile terminal 20 can be reduced compared to the allocation patterns 1 to 4 where the relay link and the access link are separated by time, while suppressing the interference between each link.

(Allocation Pattern 6)

Figure 12:
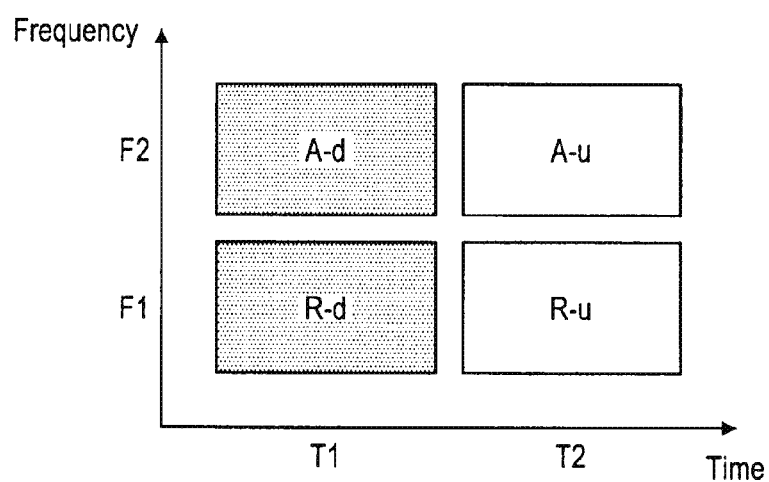
FIG. 12 is an explanatory diagram showing an allocation pattern 6 for each link.

FIG. 12 is an explanatory diagram showing an allocation pattern 6 for each link. As shown in FIG. 12, according to the allocation pattern 6, the relay downlink (R-d) is allocated to the frequency-time block defined by frequency F1/slot T1, the access downlink (A-d) is allocated to the frequency-time block defined by frequency F2/slot T1, the access uplink (A-u) is allocated to the frequency-time block defined by frequency F2/slot T2, and the relay uplink (R-u) is allocated to the frequency-time block defined by frequency F1/slot T2.

In this manner, also with the allocation pattern 6, as with the allocation pattern 5, the relay link and the access link are separated by frequency. Accordingly, the delay that occurs between the downlink of the relay link and the downlink of the access link can be reduced from a per-slot basis to a per-OFDM-symbol basis. Likewise, the delay that occurs between the uplink of the access link and the uplink of the relay link can be reduced from a per-slot basis to a per-OFDM-symbol basis.

Specifically, the base station 10 transmits data to the relay device 30 via the relay downlink at frequency F1/slot T1. Then, the relay device 30 performs, using frequency F2/slot T1, decoding, buffering, encoding, and transmission to the mobile terminal 20 via the access downlink of data received via the relay downlink, with the amount of delay on a per-OFDM-symbol basis from the reception. Additionally, the amount of delay may be variable between one OFDM symbol to a plurality of OFDM symbols.

Also, the mobile terminal 20 transmits data to the relay device 30 via the access uplink at frequency F2/slot T2. Then, the relay device 30 performs, using frequency F1/slot T2, decoding, buffering, encoding, and transmission to the base station 10 via the relay uplink of data received via the access uplink, with the amount of delay on a per-OFDM-symbol basis from the reception.

As described, according to the allocation pattern 6, the relay link and the access link are separated by frequency (FDD), and the uplink and the downlink are separated by both time and frequency (TDD). Therefore, according to the allocation pattern 6, the delay that occurs between the base station 10 and the mobile terminal 20 can be reduced compared to the allocation patterns 1 to 4 where the relay link and the access link are separated by time, while suppressing the interference between each link.

(Allocation Pattern 7)

Figure 13:
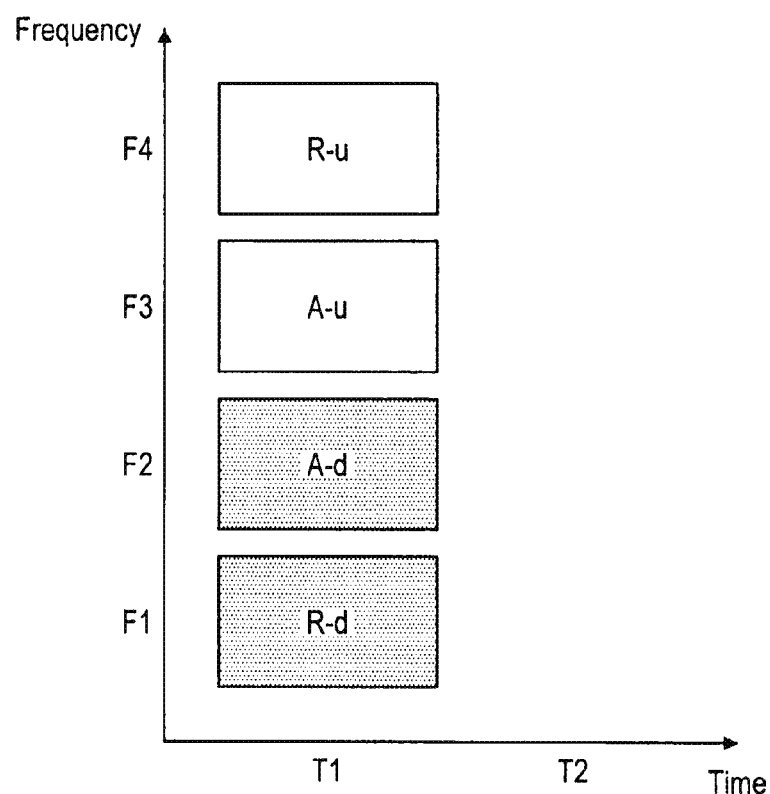
FIG. 13 is an explanatory diagram showing an allocation pattern 7 for each link.

FIG. 13 is an explanatory diagram showing an allocation pattern 7 for each link. As shown in FIG. 13, according to the allocation pattern 7, the relay downlink (R-d) is allocated to the frequency-time block defined by frequency F1/slot T1, the access downlink (A-d) is allocated to the frequency-time block defined by frequency F2/slot T1, the access uplink (A-u) is allocated to the frequency-time block defined by frequency F3/slot T1, and the relay uplink (R-u) is allocated to the frequency-time block defined by frequency F4/slot T1.

In this manner, according to the allocation pattern 7, the relay link and the access link are separated by frequency, and the uplink and the downlink are also separated by frequency. Therefore, according to the allocation pattern 7, as with the allocation patterns 5 and 6, the delay at the relay device 30 can be reduced to a per-OFDM-symbol basis, and also, to use one of the uplink and the downlink, it is not necessary to wait for the completion of the other.

Specifically, the base station 10 transmits data to the relay device 30 via the relay downlink at frequency F1/slot T1. Then, the relay device 30 performs, using frequency F2/slot T1, decoding, buffering, encoding, and transmission to the mobile terminal 20 via the access downlink of data received via the relay downlink, with the amount of delay on a per-OFDM-symbol basis from the reception. Additionally, the amount of delay may be variable between one OFDM symbol to a plurality of OFDM symbols.

Also, the mobile terminal 20 transmits data to the relay device 30 via the access uplink at frequency F3/slot T1. Then, the relay device 30 performs, using frequency F4/slot T1, decoding, buffering, encoding, and transmission to the base station 10 via the relay uplink of data received via the access uplink, with the amount of delay on a per-OFDM-symbol basis from the reception.

(Allocation Pattern 8)

Figure 14:
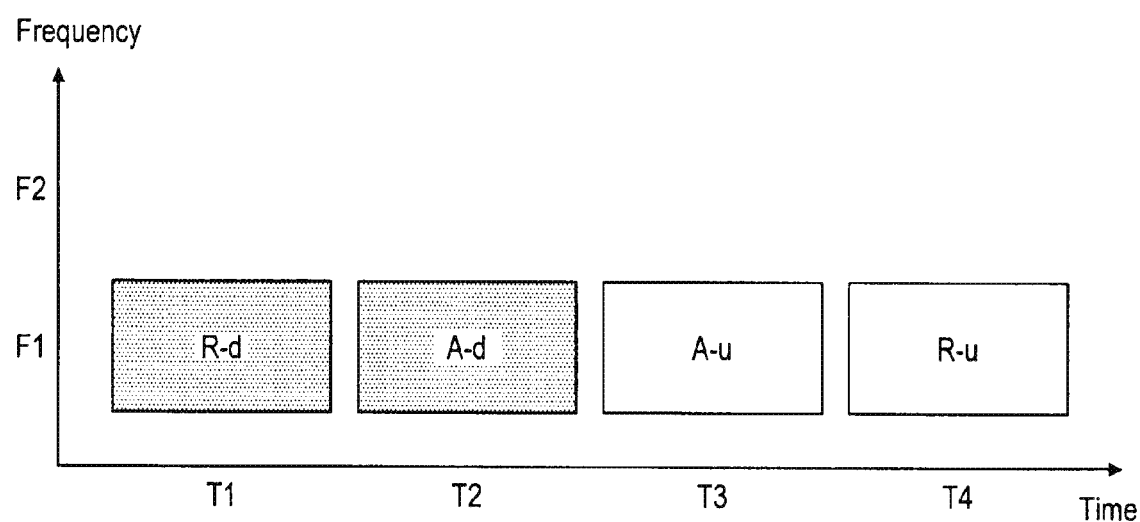
FIG. 14 is an explanatory diagram showing an allocation pattern 8 for each link.

FIG. 14 is an explanatory diagram showing an allocation pattern 8 for each link. As shown in FIG. 14, according to the allocation pattern 8, the relay downlink (R-d) is allocated to the frequency-time block defined by frequency F1/slot T1, the access downlink (A-d) is allocated to the frequency-time block defined by frequency F1/slot T2, the access uplink (A-u) is allocated to the frequency-time block defined by frequency F1/slot T3, and the relay uplink (R-u) is allocated to the frequency-time block defined by frequency F1/slot T4.

In this manner, according to the allocation pattern 8, the relay link and the access link are separated by time, and the uplink and the downlink are also separated by time. Therefore, according to the allocation pattern 8, the number of frequencies to be used is small, but the delay characteristics are deteriorated compared to other allocation patterns.

Specifically, according to the allocation pattern 1, the base station 10 transmits data to the relay device 30 via the relay downlink at frequency F1/slot T1. Then, the relay device 30 receives the data transmitted via the relay downlink, holds it in the buffer 338 as relay data, and then transmits the relay data to the mobile terminal 20 via the access downlink at frequency F1/slot T2.

Also, the mobile terminal 20 transmits data to the relay device 30 via the access uplink at frequency F1/slot T3. Then, the relay device 30 receives the data transmitted via the access uplink, holds it in the buffer 338 as relay data, and then transmits the relay data to the base station 10 via the relay uplink at frequency F1/slot T4.

(Comparison of Allocation Patterns)

As described above, there are a plurality of link allocation patterns. Also, the plurality of link allocation patterns are classified into the following four types.

Type A

A type according to which the uplink and the downlink are separated by frequency, and the relay link and the access link in the same direction are separated by time. The allocation patterns 1 to 4 correspond to type A.

Type B

A type according to which the uplink and the downlink are separated by time, and the relay link and the access link in the same direction are separated by frequency. The allocation patterns 5 and 6 correspond to type B.

Type C

A type according to which the uplink and the downlink, and the relay link and the access link are separated only by frequency. The allocation pattern 7 corresponds to type C.

Type D

A type according which the uplink and the downlink, and the relay link and the access link are separated only by time. The allocation pattern 8 corresponds to type C.

The allocation patterns belonging to the respective types A to D described above are different in delay characteristics as has been described in (Allocation Pattern 1) to (Allocation Pattern 8). Specifically, type C demonstrate the most desirable delay characteristics, and the delay characteristics are deteriorated in the order of type B, type A, and type D. On the contrary, the frequency range to be used is the narrowest for type D, and becomes wider in the order of type A, type B, and type C.

Furthermore, the communication capacity required of the relay device 30 is different depending on the allocation pattern. For example, to operate according to the allocation pattern 1, the relay device 30 needs the communication capacity to concurrently perform reception through the access link and the relay link and to concurrently perform transmission through the access link and the relay link. Also, to operate according to the allocation pattern 7, the relay device 30 needs the communication capacity to concurrently perform transmission/reception through the access link and the relay link.

(Scheduling by Scheduler)

As has been described above, there are a plurality of frequency-time allocation patterns. Also, the delay characteristics or the communication capacity required of the relay device 30 is different depending on the allocation pattern. Thus, the scheduler 156 performs appropriate scheduling according to the communication capacity of a relay device 30 for which scheduling is performed or the delay characteristics required with respect to the mobile terminal 20. In the following, scheduling by the scheduler 156 will be described together with the configurations of the SINR holding unit 152 and the relay device information holding unit 154.

The SINR holding unit 152 holds the SINR of each relay device 30 informed by the mobile terminal 20.

The relay device information holding unit 154 holds category information indicating the communication capacity of a relay device 30 imparted by the relay device 30. For example, category 1 indicates the communication capacity to operate only according to the allocation pattern 1, and category 2 indicates the communication capacity to operate according to all of the allocation patterns 1 to 8.

The scheduler 156 performs scheduling according to the SINR of each relay device 30 held in the SINR holding unit 152, the category information of each relay device 30 held in the relay device information holding unit 154, and the delay characteristics required with respect to the mobile terminal 20. A concrete example of the procedure of the scheduling is shown below.

(1) The scheduler 156 selects a relay device 30 with the highest SINR as the relay device for communication with the mobile terminal 20, based on the SINR of each relay device 30 held in the SINR holding unit 152.

(2) The scheduler 156 refers to the relay device information holding unit 154, and obtains the category information of the selected relay device 30.

(3) The scheduler 156 selects an allocation pattern satisfying the delay characteristics required with respect to the mobile terminal 20 from the compatible allocation patterns indicated by the category information.

(4) The scheduler 156 allocates, according to the selected allocation pattern, each of the relay downlink, the access downlink, the access uplink, and the relay uplink to a free frequency-time block of the radio frame.

Furthermore, the schedule information indicating the frequency-time block to which each of the relay downlink, the access downlink, the access uplink, and the relay uplink is allocated is held in the schedule information holding unit 144. Also, this schedule information is transmitted to the relay device 30 selected in (1) described above and the mobile terminal 20. As a result, the relay device 30 and the mobile terminal 20 are enabled to communicate according to this schedule information.

Additionally, the scheduler 156 may determine, in (3) described above, the delay characteristics required with respect to the mobile terminal 20 according to the attribute of transmission data, for example. For example, if the transmission data is data of a real-time strategy game, the scheduler 156 may determine that the amount of delay of the lowest level is required, and select the allocation pattern 7 with the best delay characteristics. Similarly, the scheduler 156 may determine the delay characteristics required with respect to the mobile terminal 20 according to which of audio data, still image data, video data, streaming data, download data, and the like the transmission data corresponds.

Now, a concrete example of links allocated to respective frequency-time blocks will be described with reference to FIG. 15.

Figure 15:
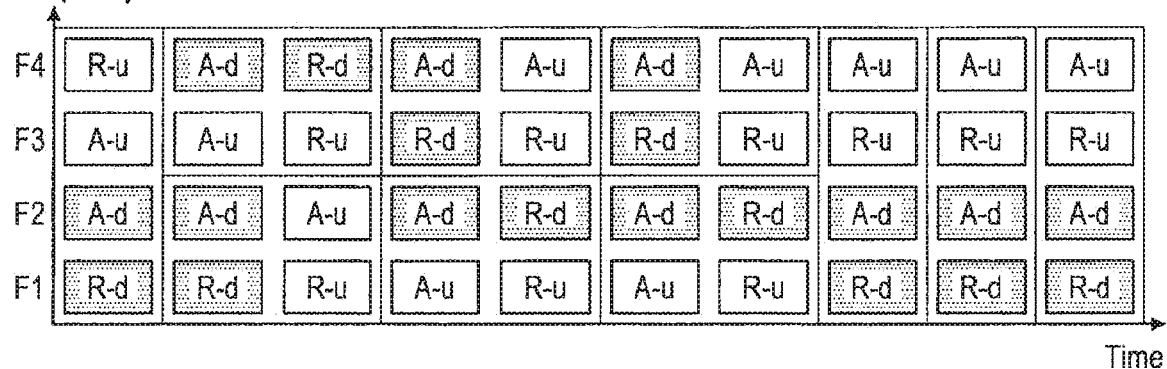
FIG. 15 is an explanatory diagram showing an example configuration of a radio frame by a combination of allocation patterns.

FIG. 15 is an explanatory diagram showing an example allocation of links to the respective frequency-time blocks forming a radio frame. In the example shown in FIG. 15, allocation of links to the respective frequency-time blocks in subframe #0 is performed according to the allocation pattern 7, and allocation of links to the respective frequency-time blocks in subframes #1 and #2 is performed according to the allocation pattern 2 and the allocation pattern 5. Similarly, links are allocated to the frequency-time blocks in other subframes according to any of the allocation patterns.

As described, according to the present embodiment, communication can be performed by combining different allocation patterns in a radio frame. Additionally, an example is shown in FIG. 15 where the subframe is the unit of allocation for the frequency-time blocks, but 0.5 ms slot may also be the unit of allocation for the frequency-time blocks.

Also, the scheduler 156 may change the allocation of links to respective frequency-time blocks for each radio frame.

Figure 16:
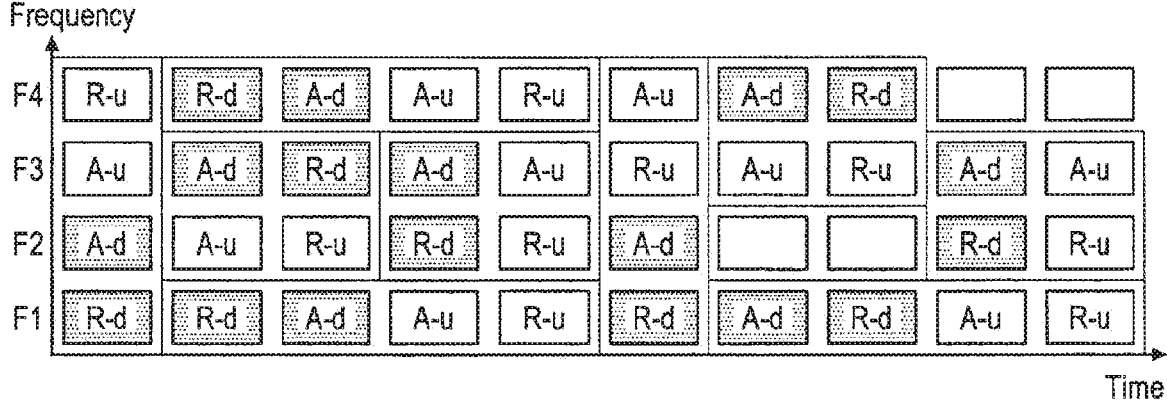
FIG. 16 is an explanatory diagram showing a modified example of a configuration of a radio frame by a combination of allocation patterns.

FIG. 16 is a modified example of the configuration of a radio frame by a combination of allocation patterns. In the example shown in FIG. 16, allocation of links to the respective frequency-time blocks in subframe #1 is performed according to the allocation pattern 7, and allocation of links to the respective frequency-time blocks at frequency F1 of subframes #1 to #4 and the respective frequency-time blocks at frequency F4 of subframes #1 to #4 is performed according to the allocation pattern 8.

As described, since the frequency used by the allocation pattern 8 is one block, the allocation pattern 8 can be arranged at a part where there is one spare block of frequency. However, the allocation pattern 8 is inferior in the delay characteristics compared to other allocation patterns, and thus the scheduler 156 may select the allocation pattern 8 for communication with the mobile terminal 20 where the allowable delay is relatively large.

Additionally, an example is described above where the scheduler 156 selects an allocation pattern to be used for the communication with the mobile terminal 20, and allocates each link to a free frequency-time block according to the selected allocation pattern, but the present embodiment is not limited to such an example. For example, the scheduler 156 may have the frequency-time blocks forming a radio frame grouped in advance according to a plurality of allocation patterns. In this case, the scheduler 156 may select an allocation pattern to be used for communication with the mobile terminal 20, and select the group of frequency-time blocks that is based on this allocation pattern as the resources for communication with the mobile terminal 20.

<5. Operation of Communication System>

In the foregoing, the configuration of the base station 10 has been described with reference to FIGS. 6 to 16. Next, the operation of the communication system 1 according to the present embodiment will be described with reference to FIG. 17.

Figure 17:
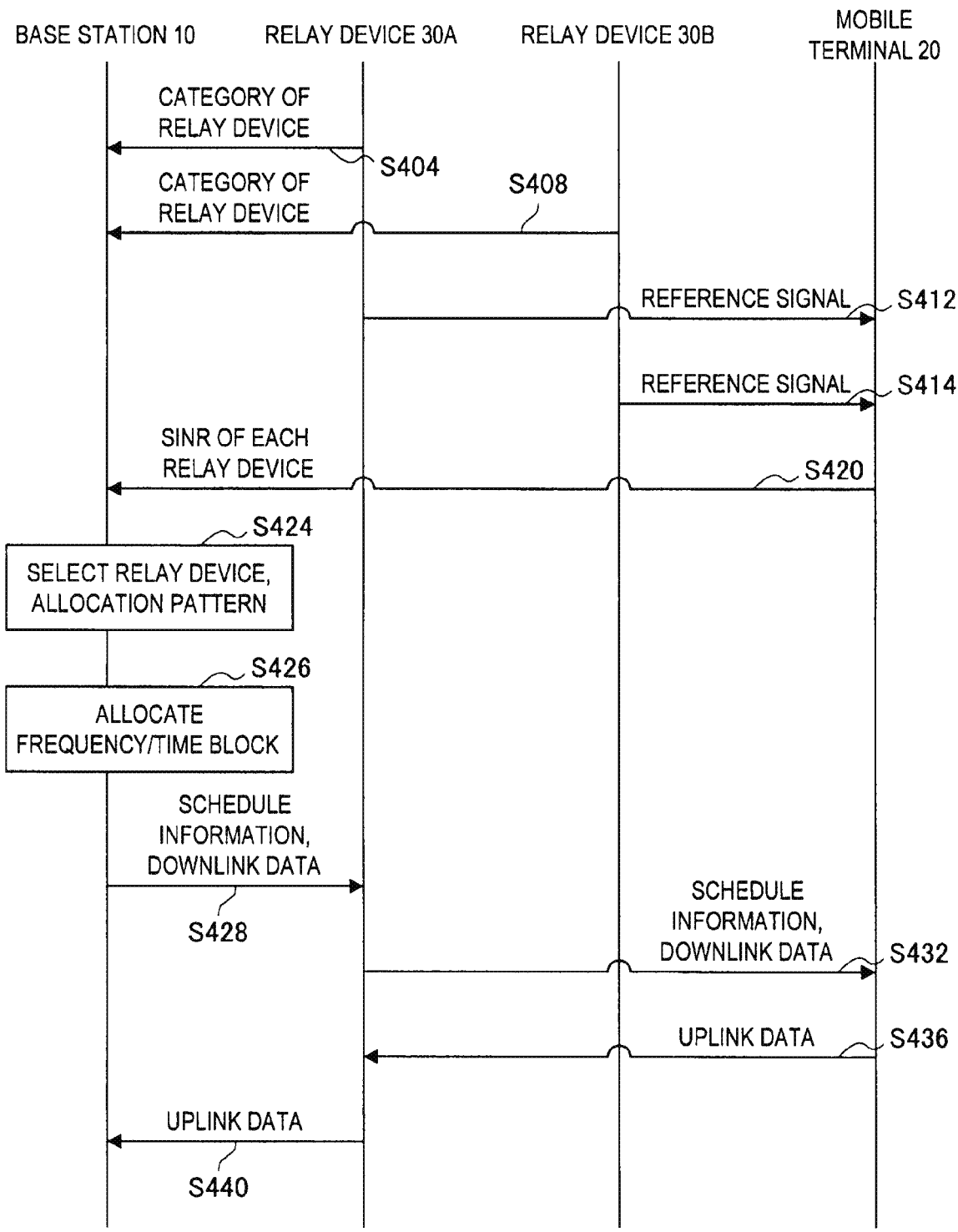
FIG. 17 is a sequence chart showing an operation of the communication system 1 according to the embodiment.

FIG. 17 is a sequence chart showing the operation of the communication system 1 according to the present embodiment. As shown in FIG. 17, each relay device 30 transmits category information indicating its communication capacity to the base station 10 (S404, S408). Also, each relay device 30 transmits a reference signal for synchronization at a predetermined timing (S412, S416).

The synchronization unit 232 of the mobile terminal 20 performs a synchronization process based on the reference signal transmitted from the relay device 30, and the SINR acquisition unit 236 acquires the SINR with respect to the relay device 30 from the correlation value obtained at the time of the synchronization process. Then, the mobile terminal 20 notifies the base station 10 of the SINR of each relay device 30 acquired by the SINR acquisition unit 236 (S420).

Then, the scheduler 156 of the base station 10 selects a relay device which is to relay the communication with the mobile terminal 20, based on the SINR of each relay device 30. In the case the relay device 30A is selected, the scheduler 156 refers to the category information of the relay device 30A, and selects an allocation pattern that the relay device 30A is compatible with and that satisfies the required delay characteristics (S424).

Furthermore, the scheduler 156 allocates, according to the selected allocation pattern, each of the relay downlink, the access downlink, the access uplink, and the relay uplink to a free frequency-time block in the radio frame (S426). Then, schedule information indicating the frequency-time block to which each link has been allocated is transmitted to the relay device 30A together with downlink data (S428), and the relay device 30A relays the schedule information and the downlink data to the mobile terminal 20 (S432).

Then, the mobile terminal 20 transmits uplink data to the relay device 30A according to the schedule information, and the relay device 30A relays the uplink data to the base station 10 according to the schedule information (S440).

<6. Summary>

As described above, the base station 10 according to the present embodiment is capable of appropriately selecting a link allocation pattern for communication with the mobile terminal 20 according to the communication capacity of the relay device 30 or the delay characteristics required with respect to the mobile terminal 20. That is, according to the present embodiment, it is possible to dynamically cope with the demands regarding delay different for each channel, and thus the total performance regarding delay can be improved.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, the steps of the processing of the communication system 1 of the present specification do not necessarily have to be processed chronologically according to the order described as the sequence chart. For example, the steps of the processing of the communication system 1 may be processed according to an order different from the order shown as the sequence chart or may be processed in parallel.

The invention claimed is:

1. A communication control device, comprising:
   circuitry configured to
      communicate with a mobile terminal, via a relay link between the communication control device and a relay device and via an access link between the relay device and the mobile terminal, by frequency-division multiplexing or time division multiplexing;
      receive information that indicates an allocation pattern, that the relay device is compatible with, of a plurality of predetermined allocation patterns, the information including identification of a category of the relay device and the category indicating a communication capacity of the relay device;
      select a predetermined allocation pattern, which the relay device is compatible with, according to the received information, of an uplink of the relay link and a downlink of the relay link for frequency-time blocks of the plurality of predetermined allocation patterns, wherein the plurality of predetermined allocation patterns are based on slot used for transmission in uplink and downlink communication in the relay link; and
      transmit second information that indicates the selected predetermined allocation pattern to the relay device, wherein
   the plurality of predetermined allocation patterns are dynamically configured to be used for the downlink of the relay link and a downlink of the access link, and
   the uplink of the relay link and an uplink of the access link are different in time.

2. The communication control device according to claim 1, wherein the plurality of predetermined allocation patterns include a type of predetermined allocation patterns where frequency-time blocks of the downlink of the relay link and the downlink of the access link.

3. The communication control device according to claim 1, wherein each of the plurality of predetermined allocation patterns has different delay characteristics.

4. The communication control device according to claim 1, wherein the circuitry further selects another predetermined allocation pattern of the uplink of the access link, and the downlink of the access link for frequency-time blocks from the plurality of predetermined allocation patterns.

5. A method for a communication control device, the method comprising:
   communicating, by circuitry of the communication control device, with a mobile terminal via a relay link between the communication control device and a relay device and via an access link between the relay device and the mobile terminal, by frequency-division multiplexing or time division multiplexing;

receiving, by the circuitry, information that indicates an allocation pattern, that the relay device is compatible with, of a plurality of allocation patterns, the information including identification of a category of the relay device and the category indicating a communication capacity of the relay device;

selecting, by the circuitry, a predetermined allocation pattern, which the relay device is compatible with, according to the received information, of an uplink of the relay link and a downlink of the relay link for frequency-time blocks of the plurality of predetermined allocation patterns, wherein the plurality of predetermined allocation patterns are based on slot used for transmission uplink and downlink communication in the relay link; and transmitting information that indicates the selected predetermined allocation pattern to the relay device, wherein the plurality of predetermined allocation patterns are dynamically configured to be used for the downlink of the relay link and a downlink of the access link, and the uplink of the relay link and an uplink of the access link are different in time.

6. The method according to claim 5, wherein the plurality of predetermined allocation patterns include a type of predetermined allocation patterns where frequency-time blocks of the downlink of the relay link and the downlink of the access link.

7. The method according to claim 5, wherein each of the plurality of predetermined allocation patterns has different delay characteristics.

8. The method according to claim 5, further comprising:
selecting, by the circuitry, a predetermined pattern of an uplink of the access link, and a downlink of the access link for frequency-time blocks from the plurality of predetermined allocation patterns.

9. A mobile terminal, comprising:
circuitry configured to communicate with a communication control device via a relay device according to a predetermined allocation pattern selected by the communication control device, wherein the circuitry communicates with the communication control device via a relay link between the communication control device and the relay device and via an access link between the relay device and the mobile terminal, the circuitry communicates with the relay device by the predetermined allocation pattern, which the relay device is compatible with, of an uplink of the relay link and a downlink of the relay link for frequency-time blocks of a plurality of predetermined allocation patterns, wherein the plurality of predetermined allocation patterns are based on subframes of radio frames used for transmission in uplink and downlink communication in the relay link, the predetermined allocation pattern being selected based on information indicating an allocation pattern, that the relay device is compatible with, of the plurality of predetermined allocation patterns, the information including identification of a category of the relay device and the category indicating a communication capacity of the relay device, the plurality of predetermined allocation patterns are dynamically configured to be used for the downlink of the relay link and a downlink of the access link, and the uplink of the relay link and an uplink of the access link are different in time.

10. The mobile terminal according to claim 9, wherein the plurality of predetermined allocation patterns include a type of predetermined allocation patterns where frequency-time blocks of the downlink of the relay link and the downlink of the access link.

11. The mobile terminal according to claim 9, wherein each of the plurality of predetermined allocation patterns have different delay characteristics.

12. A method for a mobile terminal, the method comprising:
communicating, by circuitry of the mobile terminal, with a communication control device via a relay device according to a predetermined allocation pattern selected by the communication control device, wherein the communicating with the communication control device is performed via a relay link between the communication control device and the relay device and via an access link between the relay device and the mobile terminal, the communicating with the relay device is performed by the predetermined allocation pattern, which the relay device is compatible with, of an uplink of the relay link and a downlink of the relay link for frequency-time blocks of a plurality of predetermined allocation patterns, wherein the plurality of predetermined allocation patterns are based on subframes of radio frames used for transmission in uplink and downlink communication in the relay link, the predetermined allocation pattern being selected based on information indicating an allocation pattern, that the relay device is compatible with, of the plurality of predetermined allocation patterns, the information including identification of a category of the relay device and the category indicating a communication capacity of the relay device, the plurality of predetermined allocation patterns are dynamically configured to be used for the downlink of the relay link and a downlink of the access link, and the uplink of the relay link and an uplink of the access link are different in time.

13. The method according to claim 12, wherein the plurality of predetermined allocation patterns include a type of predetermined allocation patterns where frequency-time blocks of the downlink of the relay link and the downlink of the access link.

* * * * *